(12) United States Patent
Van Bodegraven et al.

(10) Patent No.: US 12,439,492 B2
(45) Date of Patent: Oct. 7, 2025

(54) OVERVOLTAGE PROTECTION INTEGRATED IN THE MODULE TEMPERATURE PROTECTION

(71) Applicant: SIGNIFY HOLDING B.V., Eindhoven (NL)

(72) Inventors: Tijmen Cornelis Van Bodegraven, Eindhoven (NL); Zadok Vitalis Socrates Kroeze, Oss (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 94 days.

(21) Appl. No.: 18/578,069

(22) PCT Filed: Jul. 5, 2022

(86) PCT No.: PCT/EP2022/068578
§ 371 (c)(1),
(2) Date: Jan. 10, 2024

(87) PCT Pub. No.: WO2023/285208
PCT Pub. Date: Jan. 19, 2023

(65) Prior Publication Data
US 2024/0324083 A1 Sep. 26, 2024

(30) Foreign Application Priority Data
Jul. 13, 2021 (EP) ...................................... 21185391

(51) Int. Cl.
*H05B 45/50* (2022.01)
*H05B 45/3725* (2020.01)

(52) U.S. Cl.
CPC ......... *H05B 45/50* (2020.01); *H05B 45/3725* (2020.01)

(58) Field of Classification Search
None
See application file for complete search history.

(56) References Cited

U.S. PATENT DOCUMENTS

2002/0021094 A1   2/2002   De Wulf
2012/0002449 A1*  1/2012   Park .................. H02M 3/33515
                                              363/21.18

(Continued)

FOREIGN PATENT DOCUMENTS

CN   211880088 U   11/2020
DE     2548586 A1   5/1976
EP     2323247 A1   5/2011

*Primary Examiner* — Alexander H Taningco

(57) ABSTRACT

The invention relates to a circuit for providing isolated data transfer. The circuit comprises a sensor adapted to be coupled to a conversion circuit, the conversion circuit, which is adapted to use a signal generated by the sensor and an offset voltage to generate in a time sequential manner, a first voltage level and a second voltage level, wherein the second voltage level is larger than the first voltage level. The circuit comprises a voltage to current transformer circuit adapted to convert the first voltage level into a first current level within a current range and the second voltage level into a second current level within the current range, wherein the first current level and the second current level are time sequentially provided to an optocoupler. The optocoupler is adapted to receive time sequentially the first current level and the second current level and to provide an isolated output voltage having a first voltage when the first current level is provided to the optocoupler and a second voltage when the second current level is provided to the optocoupler, an analog to digital converter adapted to receive the isolated output voltage and adapted to provide a digital output voltage and a controller coupled to the analog to digital converter, wherein the controller is adapted to derive the signal generated by the sensor from the digital output voltage corresponding to the isolated output voltage received in the time sequential manner.

15 Claims, 6 Drawing Sheets

(56) References Cited

U.S. PATENT DOCUMENTS

2014/0210519 A1  7/2014  Ribarich
2019/0113570 A1* 4/2019  Astrauskas ............ G01R 15/22
2020/0382006 A1* 12/2020 Li ..................... H02M 3/33515
2020/0389093 A1  12/2020 Tietema et al.
2020/0395864 A1* 12/2020 Sen .................. H03K 3/356017

* cited by examiner

OVERVOLTAGE PROTECTION INTEGRATED IN THE MODULE TEMPERATURE PROTECTION

CROSS-REFERENCE TO PRIOR APPLICATIONS

This application is the U.S. National Phase application under 35 U.S.C. § 371 of International Application No. PCT/EP2022/068578, filed on Jul. 5, 2022, which claims the benefit of European Patent application Ser. No. 21/185, 391.6, filed on Jul. 13, 2021. These applications are hereby incorporated by reference herein.

FIELD OF THE INVENTION

The invention relates to a circuit for providing isolated data transfer. The invention further relates to an LED lighting system.

BACKGROUND OF THE INVENTION

Switched mode power supplies, SMPS, may be used to provide a regulated power to a load. The SMPS can be designed such that its output is electrically isolated from the input. This allows the SMPS to provide a galvanically isolated output. Data that needs to be sent from one end to another end of the galvanic isolation also need to be transferred in an isolated way. A common way of providing galvanically isolated data transfer is to use an optocoupler. A major drawback of an optocoupler is that it has a large gain deviation. When an absolute value of a sensed signal is to be transferred over the isolation barrier, the gain error may introduce a large error. This means that the reproducibility of the SMPS with such optocoupler is difficult since each SMPS will have an optocoupler with a different gain. The gain error can be as large as 200%. More expensive optocouplers may have a lower gain deviation. As a solution, the SMPS can be calibrated in the factory such that the gain error can be compensated. This is however also very costly and time consuming.

It is therefore desired to provide a circuit that provides an isolated data transfer, which is not expensive.

SUMMARY OF THE INVENTION

It is an objective of the invention to provide a circuit that provides an isolated data transfer in an easy and cheap way, while also providing an accurate transfer of the sensed signal.

To provide this solution, in a first aspect of the invention, a circuit for providing isolated data transfer is provided. The circuit comprising:
- a sensor adapted to be coupled to a conversion circuit;
- the conversion circuit adapted to use a signal generated by the sensor and an offset voltage to generate in a time sequential manner:
  - a first voltage level; and
  - a second voltage level, wherein the second voltage level is larger than the first voltage level,
- a voltage to current transformer circuit adapted to convert the first voltage level into a first current level within a current range and the second voltage level into a second current level within the current range, wherein the first current level and the second current level are provided to an optocoupler;
- the optocoupler adapted to receive time sequentially the first current level and the second current level and to provide an isolated output voltage signal having a first voltage when the first current level is provided to the optocoupler and a second voltage when the second current level is provided to the optocoupler;
- an analog to digital converter adapted to receive the isolated output voltage and adapted to provide a digital output voltage; and
- a controller coupled to the analog to digital converter, wherein the controller is adapted to derive the signal generated by the sensor from the digital output voltage corresponding to the isolated output voltage received in the time sequential manner.

It is an insight of the inventor that the error caused by the gain of the optocoupler can be completely filtered out by translating the sensed sensor signal into a first current level and the second current level through the optocoupler. This can be done by combining the sensed signal with a reference voltage. The reference voltage and the sensor signal are combined by the conversion circuit and translated into a first current and second current, which are time-sequentially provided to the optocoupler. The optocoupler provides two output voltages, also time-sequentially, and provides these voltages as the isolated output voltage to an analog to digital converter, ADC. The ADC provides the digitalized signal to a controller which can translate the two voltage signals back into the sensed voltage. The sensor voltage and the reference voltage are transferred by the optocoupler with an equal gain, which in this example is the current transfer ratio, CTR, of the optocoupler. The voltage generated by the sensor may change by the sensed signal. The voltage generated by the reference voltage will not change because the reference voltage is a constant voltage. Therefore, the combined sensor voltage and reference voltage only changes by the voltage change created by the sensor voltage. The combined voltage is used in the conversion circuit and the voltage to current transformer to provide the first current level and the second current level. Again, these two current levels only change by the change of the sensor signal. The digital output voltage has two time-sequential voltages, which the controller uses together with the known parameters of the offset voltage and the components used in the conversion circuit to derive back the sensor voltage. By using this combination of providing two voltage levels at the ADC, with an offset and the known parameters of the conversion circuit, the controller can now derive the sensor voltage while the gain of the optocoupler has no impact at all anymore. This means that an optocoupler with a higher gain deviation can be selected. In this case, a cheaper circuit can be made while also being more accurate.

In a further example, the conversion circuit comprises a first reference component, a second reference component and a switch, said switch being capable of coupling and decoupling the second reference component respectively to and from the conversion circuit, wherein the conversion circuit is adapted to provide the first voltage level using the first reference component and the second voltage level using the first reference component and the second reference component, wherein the first voltage level and the second voltage level are provided in the time sequential manner.

Preferably, the conversion circuit uses the first reference component and the second reference component together with the switch to generate the first voltage level and the second voltage level. The signal generated by the sensor and the offset voltage are provided to the conversion circuit and provided to the first reference component, the second reference component and the switch. The switch is controlled so that the combined signal generated by the sensor and the offset voltage are translated into the first voltage level and the second voltage level.

In a further example, the first reference component and the second reference component are each selected from a group comprising: a resistor, a capacitor, or an inductor.

Preferably, the first reference component and the second reference component are passive components. The use of passive components may keep the calculation performed by the controller simple. The conversion circuit can also be designed in a simple way. Only the switch needs to be controller. Additionally, the components can be relatively cheap while maintaining a low tolerance, allowing the total circuit to be accurate.

In a further example, the conversion circuit comprises a first resistor, a second resistor and a switch, wherein:
  the switch is coupled in series with the first resistor:
  the sensor is coupled in parallel to the series combination of the switch and the first resistor; and
  the second resistor is coupled in series with the parallel combination of the sensor and the series combination of the switch and the first resistor,
  the second resistor is coupled to a reference voltage, and wherein when the switch is closed, the first voltage level is provided and when the switch is open, the second voltage level is provided.

A preferred conversion circuit is provided with a simple resistive voltage divider, where the voltage division ratio can be adjusted by the switch. The sensor is placed in parallel with the switchable resistive voltage divider part, while a reference voltage is provided via the second resistor. This is for example desired when the sensor is used for dividing a voltage e.g. when the sensor is a resistor that varies based on a sensed parameter such as temperature or light intensity. When the switch closes, the resistance at the bottom of the resistive voltage divider is lowest, resulting in a low divided voltage, which represents the first voltage level. When the switch is opened, the resistance at the bottom of the resistive voltage divider is largest, resulting in a high divided voltage, which is represented as the second voltage level.

In a further example, the conversion circuit further comprises a third resistor coupled in parallel with the series combination of the switch and the first resistor.

Preferably, an additional resistor is placed in parallel with the first resistor so that a maximum voltage created by the conversion circuit can be defined, regardless of the behavior of the sensor.

In a further example, the conversion circuit comprises a first resistor, a second resistor, a fourth resistor and a switch, wherein:
  the switch is coupled in series with the first resistor:
  the sensor is coupled in parallel to the series combination of the switch and the first resistor via the fourth resistor; and the second resistor is coupled in series with the parallel combination of the sensor and the series combination of the switch and the first resistor,
  the second resistor is coupled to a reference voltage, and wherein when the switch is closed, the first voltage level is provided and when the switch is open, the second voltage level is provided.

Another preferred conversion circuit is provided with a simple resistive voltage divider, where the voltage division ratio can be adjusted by the switch. The sensor is placed in parallel with the switchable resistive voltage divider part via a fourth resistor, while a reference voltage is provided via the second resistor. In this case a voltage adder is created where the sensor voltage and the reference voltage are added to a single node. This is for example desired when the sensor generates a voltage. When the switch closes, the resistance at the bottom of the resistive voltage divider is lowest, resulting in a low divided voltage, which represents the first voltage level. When the switch is opened, the resistance at the bottom of the resistive voltage divider is largest, resulting in a high divided voltage, which is represented as the second voltage level.

In a further example, the conversion circuit comprises a timer adapted to generate a control signal for the switch.

A simple way for controlling the switch is to provide a timer that generates a control signal for the switch. This timer can be an independent circuit that does not require an external input. The switch is controlled in an easy way so that the first voltage level and the second voltage level can be provided time sequentially by the conversion circuit.

In a further example, the timer is an oscillator.

An easy way of providing a control for the switch is to use an oscillator. The oscillator may provide a signal with a predefined frequency. With this frequency, the first voltage level and the second voltage level will be time sequentially provided.

In a further example, the voltage to current transformer circuit is a current mirror.

A preferred way for converting the first voltage level and the second voltage level provided by the conversion circuit into currents for driving the optocoupler is to use a current mirror. The first voltage level and the second voltage level are provided to a control input of the current mirror. The current mirror translates the first voltage level and the second voltage level into the first current level and the second current level.

In a further example, the circuit comprises an operational amplifier adapted to receive the first voltage level and the second voltage level and wherein the operational amplifier is adapted to provide a control signal for the current mirror.

Preferably, an operational amplifier receives the first voltage level and the second voltage level and provides a control signal for the current mirror. The operational amplifier can be used as a voltage follower. The operational amplifier may be used to separate the output of the conversion circuit and the input of the voltage to current transformer.

In a further example, the circuit comprises an overruling circuit adapted to provide an overruling current to the optocoupler larger or lower than a current provided in the current range.

In addition to the sensor providing a signal that is provided via the optocoupler to the controller, the optocoupler can be used to provide an additional signal to the controller. The sensor signal is translated into a first voltage level and a second voltage level within a voltage range, which is transformed into a first current level and a second current level. These two current levels are therefore also within a specified range. Another signal can be used to generate a current that is outside the specified range. This signal can be an overruling signal that can be larger that the maximum current of the second current level. An example of an overruling signal can be an overvoltage protection. This overvoltage protection allows a current to flow through the optocoupler that is higher than the maximum current of the second current level. The controller may be configured to know what the maximum current of the second current level is and how this translates into the maximum voltage level of the isolated output voltage. The controller may in this example know what the operating window of the sensor is i.e. what the operating window is in which the first voltage level and the second voltage level are generated. The controller then automatically can be configured to interpret an isolated output voltage corresponding to a current provided to the optocoupler that lies outside this window to be an overruling signal. The controller can then be used to shut down another circuit such as an SMPS driving a load.

In a further example, the circuit comprises a disabling circuit adapted to receive the isolated output voltage and wherein the disabling circuit is adapted to provide a disable signal when the overruling current is provided to the optocoupler.

Instead of the controller responding to the overruling signal, a dedicated circuit can be used to provide a disable signal in the case an overruling signal is present in the isolated output voltage. This dedicated circuit can provide for more safety and a direct response to the optocoupler providing the overruling signal.

In a further example, the sensor is arranged to provide a voltage as the signal generated by the sensor.

In a further example, the sensor comprises a resistive element adapted to be coupled to the conversion circuit.

Preferably, the sensor can provide a voltage to the conversion circuit. Alternatively, the sensor can comprise a resistive element that is coupled to the conversion circuit. In this way, the sensor may provide an additional input for the conversion circuit e.g. an additional resistance in the resistive voltage division circuit.

In another example and LED lighting system is provided. The system comprises:
 a driver for powering a lighting load:
 the lighting load, and
 the circuit according to any of the preceding claims.

The circuit for providing isolated data transfer is preferably used in a system comprising a driver for driving a lighting load. A sensor can be used to provide data to a controller for e.g. controlling the light output of the lighting load.

BRIEF DESCRIPTION OF THE DRAWINGS

Examples of the invention will now be described with reference to the accompanying drawings, in which.

DETAILED DESCRIPTION OF THE EMBODIMENTS

Figure 1:
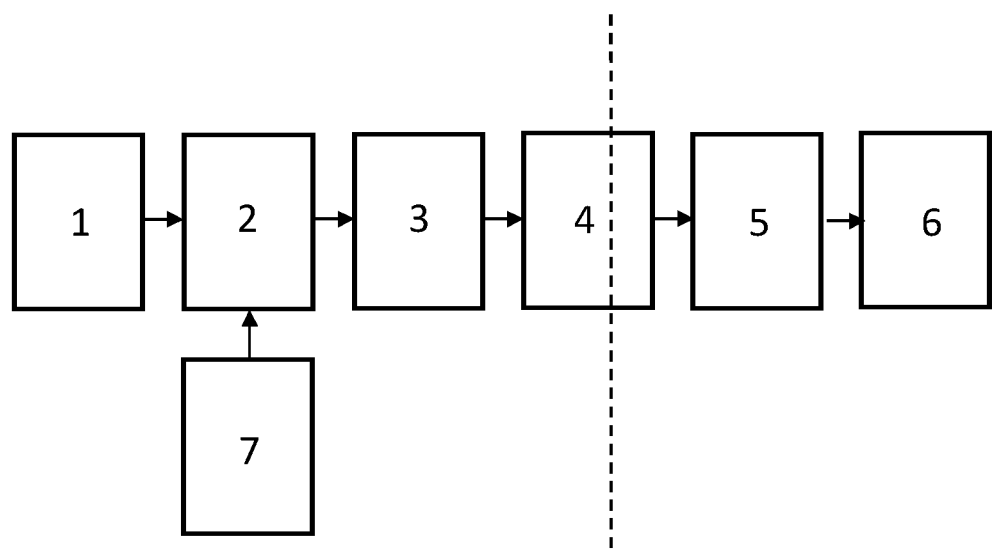
FIG. 1 shows an example of a function diagram of a circuit for providing isolated data transfer.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should also be understood that the Figures are merely schematic and are not drawn to scale. It should also be understood that the same reference numerals are used throughout the Figures to indicate the same or similar parts.

FIG. 1 shows an example of a function diagram of a circuit for providing isolated data transfer. A sensor 1 is coupled to a conversion circuit 2. The sensor 1 may be used for sensing a parameter from the environment. Examples of such a sensor 1 may be any of, but not limited to, a light sensor, a temperature sensor, a current sensor, a voltage sensor, an infrared sensor, motion sensor, sound sensor, gravity-sensor or a $CO_2$ sensor. The sensor 1 generates a sensor signal based on the sensed parameter e.g. light, temperature, current or voltage. The sensor signal is provided to the conversion circuit 2. The conversion circuit 2 receives the sensor signal and an offset voltage. The offset voltage may be created by a reference voltage. Preferably, this reference voltage is a stable voltage to improve the accuracy of the circuit. The conversion circuit 2 combines the offset voltage with the sensor signal into a single signal that is being transformed into a first voltage level and a second voltage level in a time sequential manner. The first voltage level and the second voltage level are outputted by the conversion circuit 2 and are provided to the voltage to current transformer circuit 3. The first voltage level may be provided by using a first reference component and a second reference component by coupling the second reference component by closing a switch in series with the second reference component. The second voltage may be provided by using the first reference component and by decoupling the second reference component by opening the switch. Preferably, the first reference component and the second reference component are each selected from a group comprising: a resistor, a capacitor, or an inductor. Even more preferred is that the first reference component and the second reference component are resistors. The optocoupler 4 is driven by a current, and therefore the first voltage level and the second voltage level need to be transformed in a first current level and a second current level respectively.

Because the first current level and the second current level are based on the first voltage level and the second voltage respectively, the first current level and the second current level are also generated time sequentially. The voltage to current transformer circuit 3 provides the first current level and the second current level to the optocoupler 4. The first current level and the second current level flowing through the optocoupler 4 will allow a first current and a second current to flow through the secondary side of the optocoupler 4 respectively. These are translated into voltages again as the isolated output voltage. The isolated output voltage is provided to the analog to digital converter, ADC 5. The ADC 5 digitalizes the isolated output voltage and provides it to the controller 6. The controller 6 receives the digitalized output voltage, which is directly related to the first voltage level and the second voltage level. The controller 6 has knowledge of the reference voltage used for creating the first voltage level and the second voltage level. The controller 6 also has knowledge of the components used for generating the first voltage level and the second voltage level. This allows the controller 6 to derive back the signal generated by the sensor 1. The combined signal of the sensor signal and the offset voltage are translated to the secondary side via the optocoupler 4 with an unknown gain. Both the sensor signal and the offset voltage are translated with a similar gain. By using the sensor signal and the offset voltage to generate the first voltage level and the second voltage level, the controller 6 is provided with additional information, besides the known offset voltage and the components used for generating the first voltage level and the second voltage level, allowing to derive the sensor signal independently of the gain of the optocoupler 4. Because the sensor signal can now be derived without any dependency of the gain of the optocoupler 4, it is not relevant anymore to take the gain tolerance of the optocoupler 4 into consideration when designing the circuit. Additionally, during the lifetime of the optocoupler 4, the gain may vary, which now does not impact the accuracy of the circuit anymore.

Preferably, a timer circuit 7 is provided to control the conversion circuit 2 to generate the first voltage level and the second voltage level time sequentially.

Figure 2:
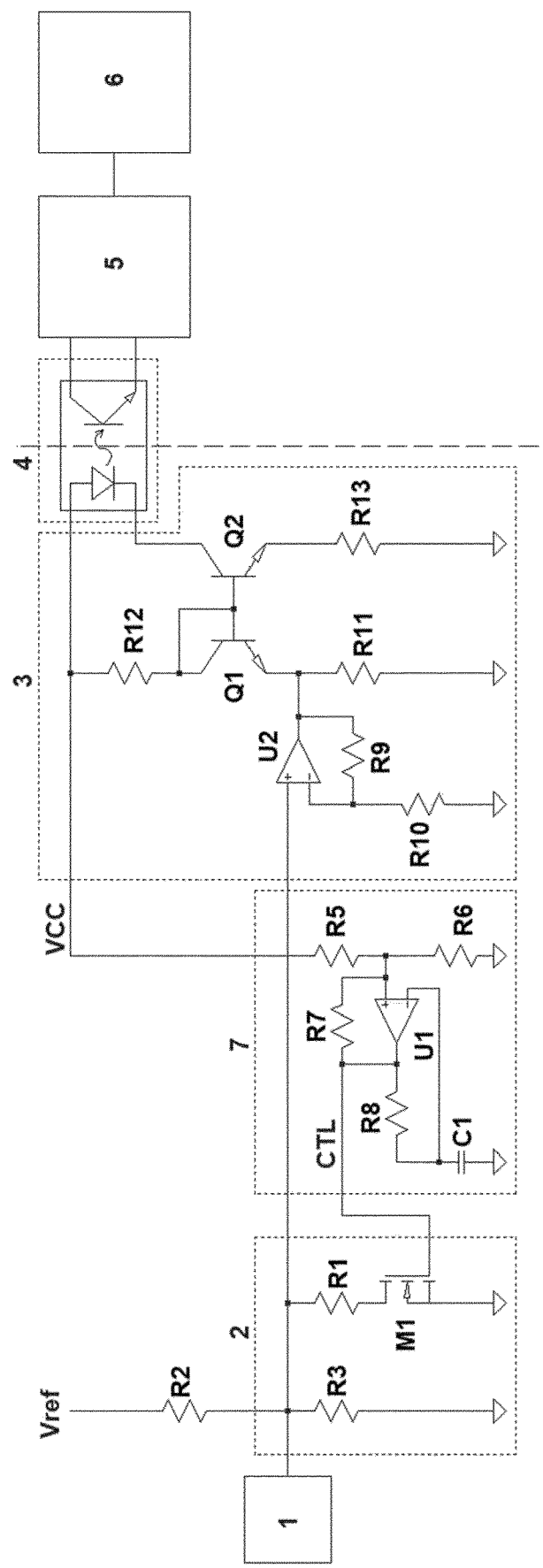
FIG. 2 shows an example of a schematic of a circuit for providing isolated data transfer.

FIG. 2 shows a detailed example of a schematic of the circuit. A sensor 1 is coupled to an input node of the conversion circuit 2. A reference voltage is provided to another input node of the conversion circuit. The reference voltage is converted to the offset voltage by the second resistor R2. The offset voltage is provided to the input node where the sensor 1 is connected to. A series combination of a first resistance R1 and a switch M1 is placed between the input node and the ground reference. In this example, the sensor may be a sensor that provides an additional resistance to ground reference. Examples of such sensors can be positive of negative temperature coefficient, NTC or PTC resistors, or photosensitive resistors. In this example, this results in the sensor resistance being in parallel with the series combination of the first resistance R1 and the switch M1, similar to the third resistor R3. The third resistor R3 is an optional resistor and may be used to provide a better predefined voltage operating area at the input node.

The resistors in the conversion circuit 2 form a resistive voltage divider. By controlling the switch M1, the voltage division ratio can be altered. By closing the switch M1, the first resistor R1 is placed in parallel with the resistance of the sensor 1. By opening the switch M1, the first resistance R1 is disconnected from the input node and therefore not in parallel with the resistance of the sensor 1. Time sequentially turning on and off the switch M1 causes the voltage at the input node, which is also the output of the conversion circuit 2, to be at a first voltage level when the switch M1 is closed and a second voltage level when the switch M1 is opened. In this example, the second voltage level is higher than the first voltage level.

The first voltage level and the second voltage level are provided to the input of the voltage to current converter circuit 3. In this example, the voltage to current converter circuit 3 preferably receives the first voltage level and the second voltage level at a non-inverting input of an operational amplifier U2. The operational amplifier U2 in this example is embodied as a voltage follower. This is beneficial as the voltage follower isolates its input from its output. This means that the input, in this example the resistive voltage divider, is not influenced by the output, in this example resistor R11.

The voltage follower has a further input, the inverting input, which is coupled to a reference voltage via resistor R10. In this example, the reference is the ground reference. The inverting input is further coupled to the output of the operational amplifier U2 via a resistor R9. If a unity gain of the voltage follower is desired, the resistor R10 is omitted, so no connection to the ground reference is present, and the resistor R9 is shorted so that the output of the operational amplifier U2 is directly coupled to the inverting input.

The output of the voltage follower is coupled to an input of a current mirror. In this example, the input of the current mirror is between the resistor R11 and the transistor Q1. A reference current will flow through the branch of resistor R12, transistor Q1 and resistor R11 based on a supply voltage applied to the resistor R12 and the voltage applied to the input of the current mirror i.e. between resistor R11 and transistor Q1. The reference current is mirrored to the output of the current mirror, which is coupled to a cathode of the light emitting diode in the optocoupler 4. The output has a branch of resistor R12, transistor Q2 and resistor R13 and causes the same current as the reference current to be drawn through the light emitting diode in the optocoupler 4. When the first voltage level is applied to the input of the voltage to current converter circuit 3, the current mirror receives a relatively low voltage and this is translated back as a low current through the light emitting diode of the optocoupler 4. When the second voltage level is provided to the input of the voltage to current converter circuit 3, the current mirror receives a relatively large voltage and this is translated back as a high current through the light emitting diode of the optocoupler 4. The first voltage level and the second voltage level are within a voltage range such that the current through the light emitting diode of the optocoupler 4 does not cause a saturation in the transfer of the optocoupler 4. When the optocoupler 4 gets saturated, the first voltage level and the second voltage level can not be used anymore to accurately derive the sensor signal.

Preferably resistors R11 and R13 have the same values so that the base currents of the transistors Q1 and Q2 are identical. This is especially beneficial when the transistors are in the same package or on the same die.

The optocoupler 4 receives the first current level and the second current level in a time sequential way. The optocoupler 4 translates these current levels into an isolated output voltage. This isolated output voltage is provided to an analog to digital converter, ADC 5. The ADC digitizes the isolated output voltage and provides it to a controller 6. Preferably, the ADC is an integrated part of the controller 6. The controller 6 may for example be a microcontroller having the ADC integrated.

The controller 6 receives a digitalized isolated output voltage with two voltage levels.

Figure 3:
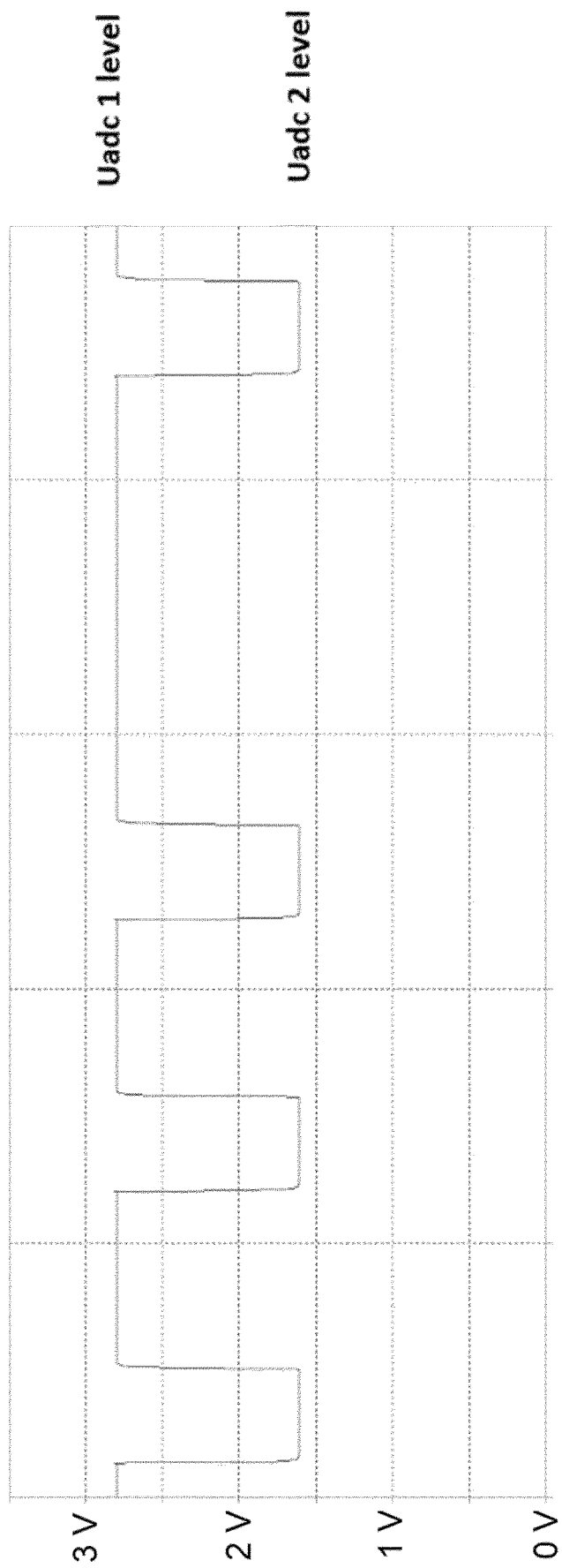
FIG. 3 shows exemplary waveforms created by the circuit.

FIG. 3 shows an example of the waveform of the isolated output voltage that is provided to the ADC 5. Uadc 1 level is the voltage level of the isolated output voltage that is generated by the second voltage level generated by the conversion circuit 2. Uadc 2 level is the voltage level of the isolated output voltage that is generated by the first voltage level generated by the conversion circuit 2. As can be seen in FIG. 3, the Uadc 1 level and the Uadc 2 level are provided time sequentially to the ADC 5. In this example, the duty cycle and frequency are chosen arbitrary. The duty cycle and the frequency may be altered purposely so that the duty cycle and frequency can be used for transmitting additional information via the optocoupler 4. Alternatively, the duty cycle and the frequency may be kept constant. This provides for an easier and cheaper circuit.

Figure 4:
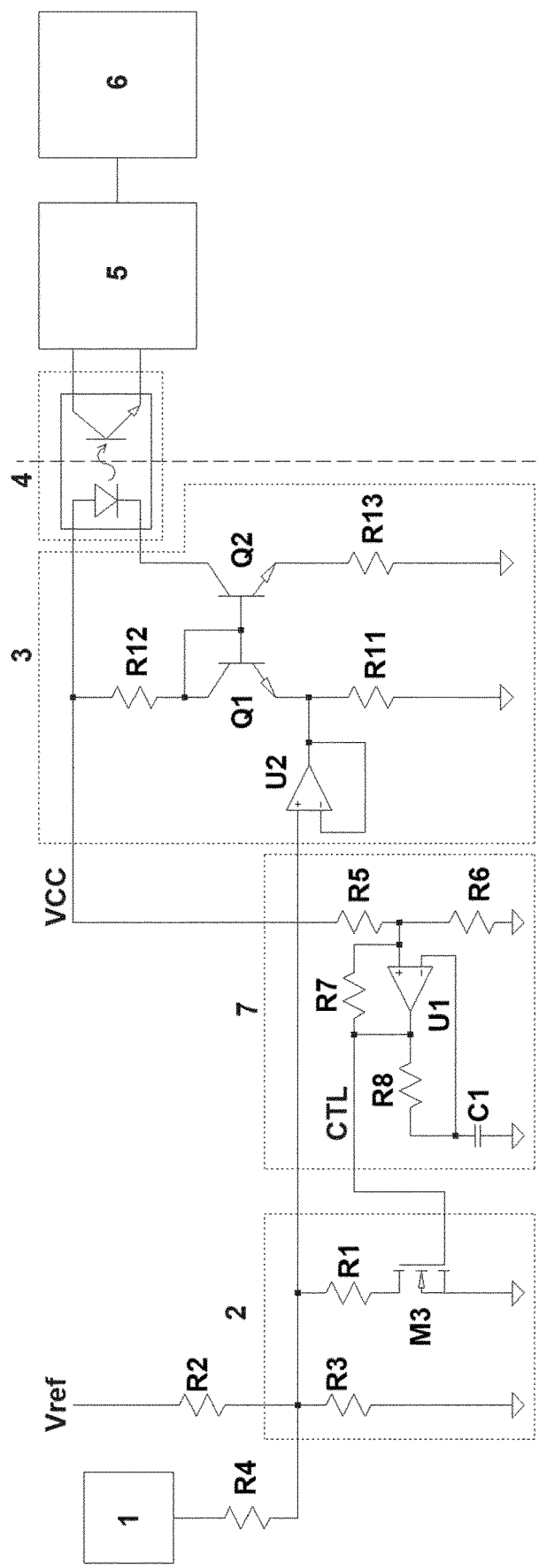
FIG. 4 shows another example of a schematic of a circuit for providing isolated data transfer.

FIG. 4 shows an example of the circuit for providing the isolated data transfer where the sensor 1 is capable of generating its own voltage. Such a sensor 1 can be for example an infrared sensor, motion sensor, sound sensor, gravity-sensor or a $CO_2$ sensor.

In the situation of a sensor 1 capable of generating a voltage the output of the sensor 1, it is preferred to provide a voltage adder to provide the sensor signal and offset voltage to the conversion circuit 2. The sensor voltage is provided to the conversion circuit 2 via a resistor R4 as the sensor signal. The reference voltage is provided to the conversion circuit 2 via a resistor R2 as the offset voltage. In the conversion circuit 2, the sensor signal and the offset voltage are added and used to generate the first voltage level and the second voltage level. The voltage to current converter circuit 3 converts the first voltage level and the second voltage level into the first current level and the second current level. This may be done similarly as done by the voltage to current converter circuit 3 as shown in FIG. 2. The optocoupler 4 receives the first current level and the second current level and provides in a time sequential way. The optocoupler 4 translates these current levels into an isolated output voltage. This isolated output voltage is provided to an analog to digital converter, ADC 5. The ADC digitalizes the isolated output voltage and provides it to a controller 6. Preferably, the ADC is an integrated part of the controller 6. The controller 6 may for example be a microcontroller having the ADC integrated.

The controller 6 receives the digitalized isolated output voltage with two voltage levels.

Figure 5:
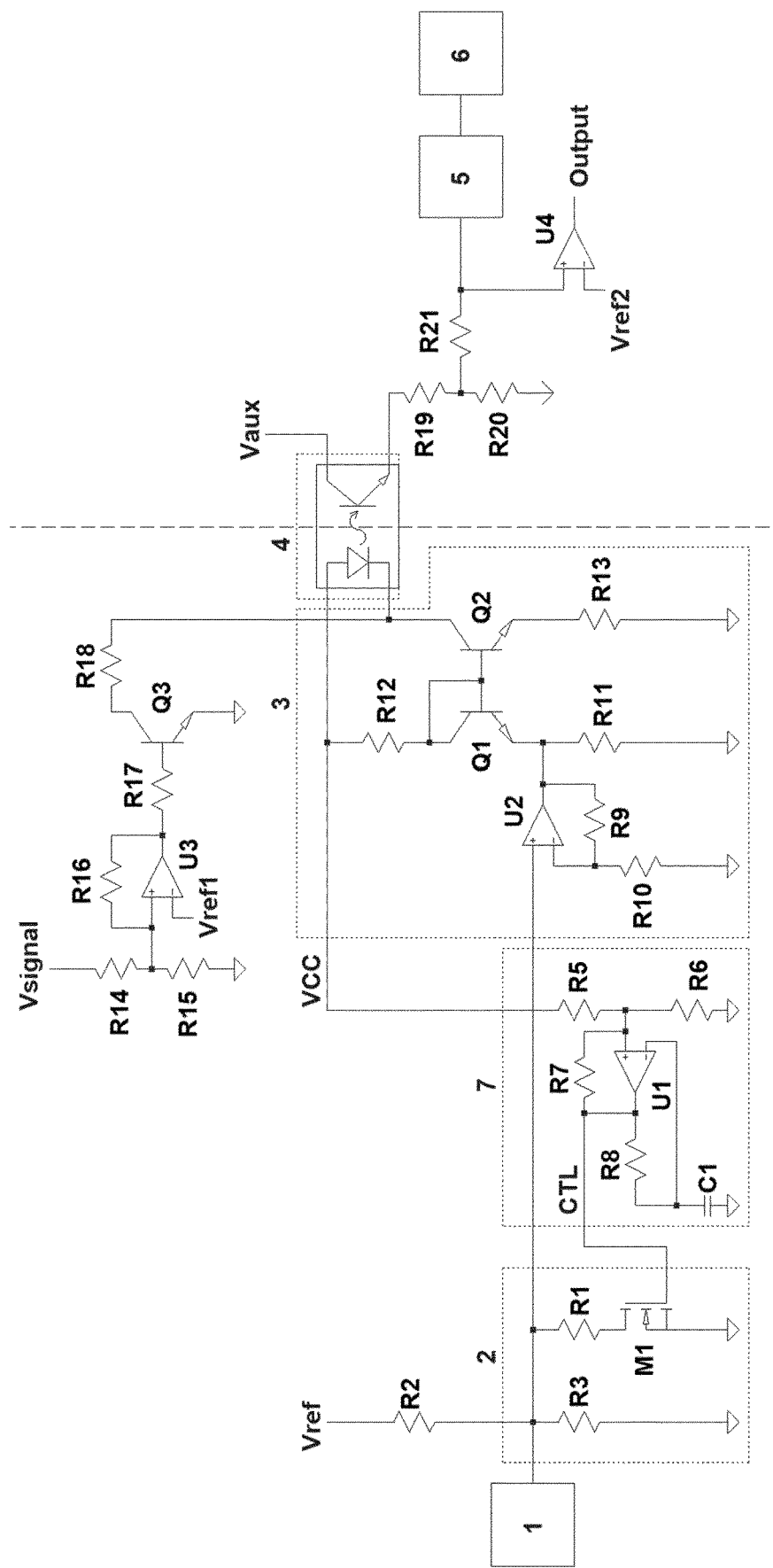
FIG. 5 shows a further example of a schematic of a circuit for providing isolated data transfer.

FIG. 5 shows an improved example of the circuit for providing the isolated data transfer. Preferably, the conversion circuit 2 and the voltage to current transformer circuit 3 are the same as described in the other examples. The conversion circuit 2 may receive a sensor signal by a sensor 1 that is provided by a sensor 1 that is either passive or active i.e. the sensor 1 can provide a voltage itself or act passively by drawing a current provided by an external voltage source. The interconnection between the sensor 1 and the conversion circuit 2 may be therefore identical as in FIG. 2 or in FIG. 4.

The voltage to current conversion circuit 3 provides the first current level and the second current level to the optocoupler 4 similar to the aforementioned examples. An overruling circuit is provided. The overruling circuit is used to provide a current to the optocoupler 4 that lies outside the current range that corresponds to the range wherein the first current level and the second current level are generated. This means that the isolated output voltage will also be outside the normal operating voltage window of the isolated output voltage. The controller 5 can interpret this signal as a signal that may overrule the signal that would be generated in the normal operating window of the isolated output voltage.

The overrule signal can be generated as a response to an undesired situation. It may be desired to provide a signal that overrules the signals needed during normal operation and provide a signal that may overrule the normal operation so that a system using this circuit may enter a different e.g. emergency mode. A system with this circuit may for example shut down such that a load remains unpowered.

In this example, the overruling circuit receives a voltage that is monitored. Such a voltage can for example be a voltage present at a load. The monitored voltage is provided to the non-inverting input of the operational amplifier U3 via a resistive divider of resistor R14 and resistor R15. A resistor R16 is placed between the non-inverting input and the output of the operational amplifier U3. The inverting input of the operational amplifier U3 is connected to a reference voltage Vref1. The operational amplifier U3 compares the monitored voltage with the reference voltage and outputs a high signal when the monitored voltage, resistively divided via resistors R14 and R15, exceeds the threshold voltage Vref1. The output of the operational amplifier U3 is coupled to a base of transistor Q3 via a resistor R17. The transistor Q3 and resistor R18 provide a current sink path for the optocoupler 4. The current sink path allows a current to flow that is either higher or lower than the current that would flow by the voltage to current converter circuit 3 with the first current level or the second current level. In this example, the current flowing through the optocoupler 4 via the current sink path is higher than any of the first current level or the second current level and larger than the current range. This means that the first current level and the second current level can never reach the amplitude of the current level created by the current sink path.

Preferably, in combination with the overruling circuit, the circuit also has a disabling circuit. This circuit has the dedicated function of detecting the signal created by the overruling circuit i.e. the isolated output voltage level being larger than the maximum voltage that can be created by the second voltage level and therefore the second current level within its designated current range. The overruling circuit may generate a shut down signal that allows the shutdown or disabling of other circuitry.

In this example, the overruling circuit receives the isolated output voltage from the optocoupler 4 at a non-inverting input. The inverting input of the operational amplifier U4 is coupled to a reference voltage Vref2. The isolated output voltage, resistively divided by resistors R19 and R20, is compared with the threshold voltage Vref2. If the isolated output voltage exceeds the reference voltage Vref2, the operational amplifier U4, also referred to as a comparator, provides a high output signal.

Figure 6:
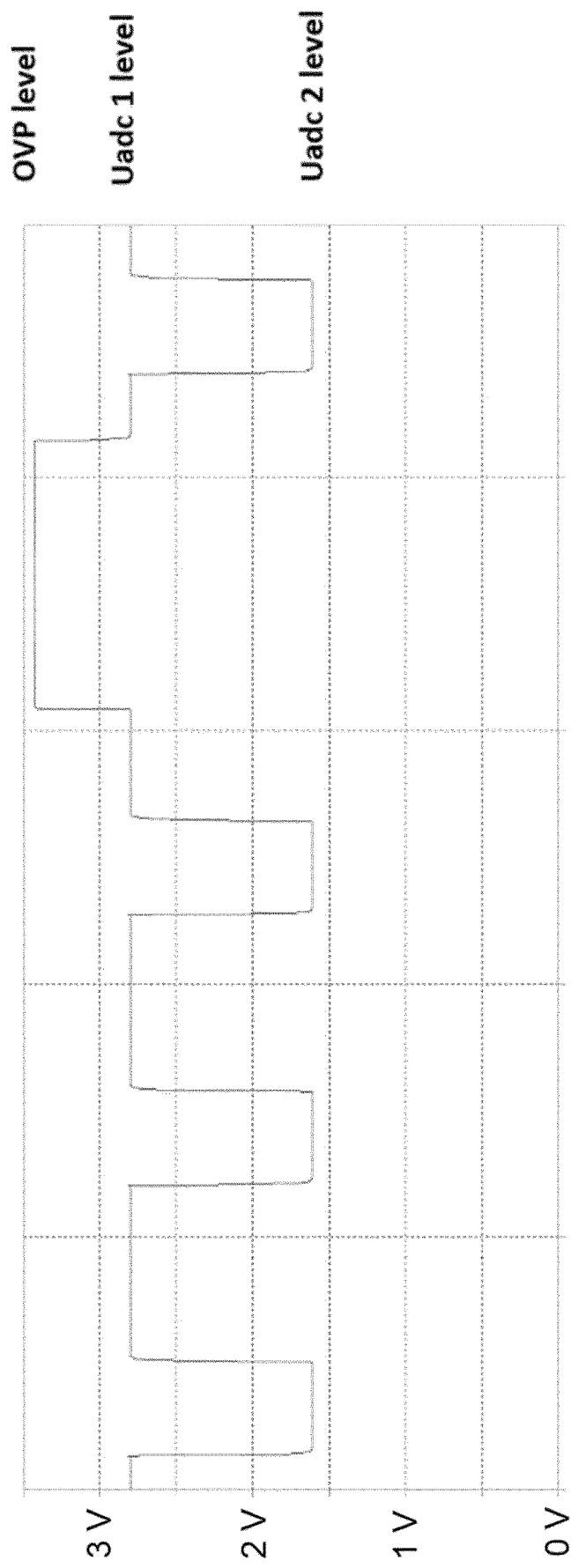
FIG. 6 shows exemplary waveforms created by the circuit.

FIG. 6 shows an example of the waveform of the isolated output voltage that is provided to the ADC 5. Preferably, this isolated output voltage is also provided to the disabling circuit. Uadc 1 level is the voltage level of the isolated output voltage that is generated by the second voltage level generated by the conversion circuit 2. Uadc 2 level is the voltage level of the isolated output voltage that is generated by the first voltage level generated by the conversion circuit 2. As can be seen in FIG. 3, the Uadc 1 level and the Uadc 2 level are provided time sequentially to at least the ADC 5. In this example, the duty cycle and frequency are chosen arbitrary. The duty cycle and the frequency may be altered purposely so that the duty cycle and frequency can be used for transmitting additional information via the optocoupler 4. Alternatively, the duty cycle and the frequency may be kept constant. This provides for an easier and cheaper circuit. In addition to the generated Uadc 1 level and the Uadc 2 level, a third voltage level OVP is present. Preferably, the third voltage level OVP is the highest voltage that can be generated with the optocoupler 4.

Preferably, in the examples provided, a timer circuit 7 is provided to control the timing of creation of the first voltage level and the second voltage level. A very simple timer circuit 7 can be an oscillator, which operates at a predefined frequency and duty cycle. The frequency and duty cycle are not relevant for the controller to derive back the sensor signal and can therefore be freely chosen as desired by the designer of the circuit. The oscillator provided in the examples has an operational amplifier U1 with the non-inverting input coupled to a supply voltage using a resistor R5 and coupled to the ground reference using a resistor R6. The non-inverting input is further coupled to the output of the operation amplifier U1 via a resistor R7. The output is further coupled to a control node of the switch M1. The output is coupled to the inverting input of the operational amplifier U1 via a resistor R8. The inverting input is further coupled to the ground reference via capacitor C1. The capacitor C1 and resistor R8 are used to set the oscillation frequency of the timer circuit 6.

It is to be understood that the offset voltage can be provided in a different way into the conversion circuit 2. The offset voltage can also be placed between the series combination of the first resistance R1 and the switch M1, and the ground reference. When taking the optional third resistance R3, offset voltage is placed between the parallel combination of the third resistance R3 and the series combination of the first resistance R1 and the switch M1 and the ground reference.

Preferably, the circuit is implemented in an LED lighting system. The LED system may have a driver that provides a power to an LED load. A circuit according to the invention can be provided to allow the driver to operate with additional parameters. The circuit allows the driver to read out actual values generated by the sensor 1. In addition, an overruling can be implemented and shut down the driver in case of an error.

Preferably, the signal that is generated by the sensor 1 is a time continuous signal, which means that the signal is not modulated via e.g. a pulse width modulated signal. The circuit allows this time continuous signal to be provided to a microcontroller without affecting the signal integrity of the signal.

Preferably, the first voltage level is greater than zero.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A circuit for providing isolated data transfer, the circuit comprising:
    a sensor adapted to be coupled to a conversion circuit;
    the conversion circuit adapted to use a signal generated by the sensor and an offset voltage to generate in a time sequential manner:
        a first voltage level; and
        a second voltage level, wherein the second voltage level is larger than the first voltage level,
    a voltage to current transformer circuit adapted to convert the first voltage level into a first current level within a current range and the second voltage level into a second current level within the current range, wherein the first current level and the second current level are time sequentially provided to an optocoupler;
    the optocoupler adapted to receive time sequentially the first current level and the second current level and to provide an isolated output voltage signal having a first voltage when the first current level is provided to the optocoupler and a second voltage when the second current level is provided to the optocoupler;
    an analog to digital converter adapted to receive the isolated output voltage and adapted to provide a digital output voltage; and
    a controller coupled to the analog to digital converter, wherein the controller is adapted to derive the signal generated by the sensor from the digital output voltage corresponding to the isolated output voltage received in the time sequential manner.

2. The circuit according to claim 1, wherein the conversion circuit comprises a first reference component, a second reference component and a switch, the switch being capable of coupling and decoupling the second reference component respectively to and from the conversion circuit, wherein the conversion circuit is adapted to provide:
    the first voltage level using the first reference component and the second reference component by coupling the second reference component; and
    the second voltage level using the first reference component by decoupling the second reference component,
    wherein the first voltage level and the second voltage level are provided in the time sequential manner.

3. The circuit according to claim 2, wherein the first reference component and the second reference component are each selected from a group comprising: a resistor, a capacitor, or an inductor.

4. The circuit according to claim 1, wherein the conversion circuit comprises a first resistor, a second resistor and a switch, wherein:
    the switch is coupled in series with the first resistor;
    the sensor is coupled in parallel to the series combination of the switch and the first resistor; and
    the second resistor is coupled in series with the parallel combination of the sensor and the series combination of the switch and the first resistor,
    the second resistor is coupled to a reference voltage, and wherein when the switch is closed, the first voltage level is provided and when the switch is open, the second voltage level is provided.

5. The circuit according to claim 4, wherein the conversion circuit further comprises a third resistor coupled in parallel with the series combination of the switch and the first resistor.

6. The circuit according to claim 1, wherein the conversion circuit comprises a first resistor, a second resistor, a fourth resistor and a switch, wherein:
    the switch is coupled in series with the first resistor;
    the sensor is coupled in parallel to the series combination of the switch and the first resistor via the fourth resistor; and
    the second resistor is coupled in series with the parallel combination of the sensor and the series combination of the switch and the first resistor,
    the second resistor is coupled to a reference voltage, and wherein when the switch is closed, the first voltage level is provided and when the switch is open, the second voltage level is provided.

7. The circuit according to claim 1, wherein the conversion circuit comprises a timer circuit adapted to generate a control signal for the switch.

8. The circuit according to claim 7, wherein the timer circuit is an oscillator.

9. The circuit according to claim 1, wherein the voltage to current transformer circuit is a current mirror.

10. The circuit according to claim 9, further comprising an operational amplifier adapted to receive the first voltage level and the second voltage level and wherein the operational amplifier is adapted to provide a control signal for the current mirror.

11. The circuit according to claim 1, further comprising an overruling circuit adapted to provide an overruling current to the optocoupler larger or lower than a current provided in the current range.

12. The circuit according to claim 11, further comprising a disabling circuit adapted to receive the isolated output voltage and wherein the disabling circuit is adapted to provide a disable signal when the overruling current is provided to the optocoupler.

13. The circuit according to claim 1, wherein the sensor is arranged to provide a voltage as the signal generated by the sensor.

14. The circuit according to claim 1, wherein the sensor comprises a resistive element adapted to be coupled to the conversion circuit.

15. An LED lighting system comprising:
a driver for powering an LED lighting load;
the LED lighting load, and
the circuit according to claim 1.

* * * * *